Nov. 14, 1967  A. L. BRIAN  3,352,574
PROTECTIVE RINGS FOR PIPE COATINGS
Filed Feb. 12, 1965
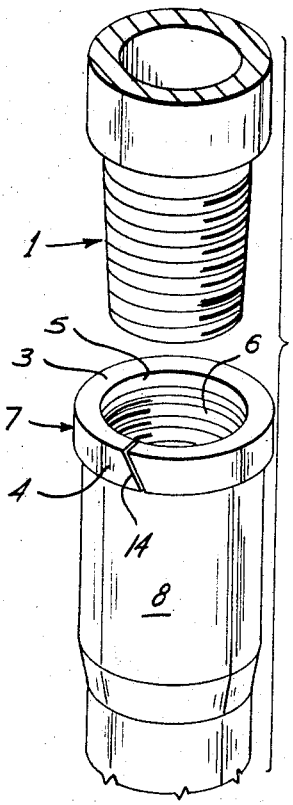
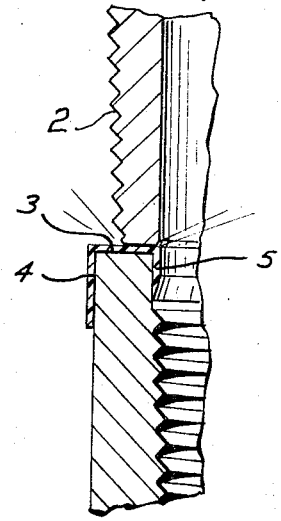
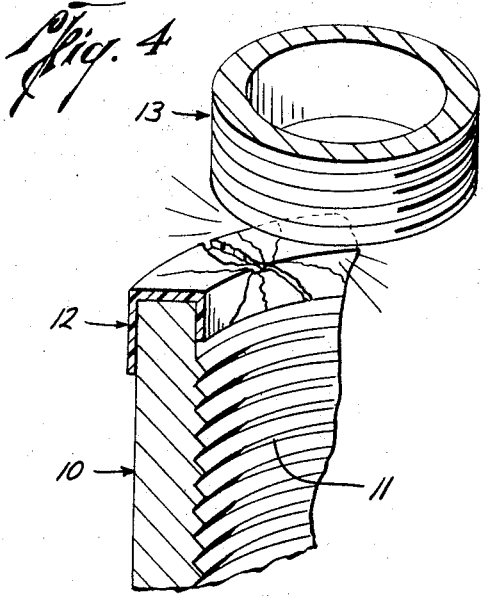
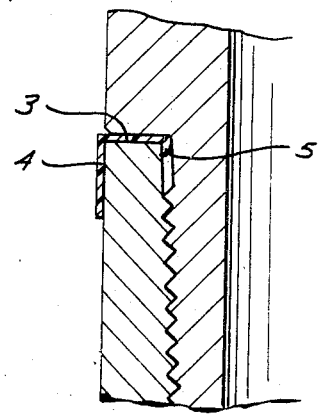
Arthur L. Brian
INVENTOR.
BY Arnold and Roylance
ATTORNEYS

United States Patent Office 3,352,574
Patented Nov. 14, 1967

3,352,574
PROTECTIVE RINGS FOR PIPE COATINGS
Arthur L. Brian, 4707 Knotty Oaks Trail,
Houston, Tex. 77045
Filed Feb. 12, 1965, Ser. No. 432,225
3 Claims. (Cl. 285—3)

ABSTRACT OF THE DISCLOSURE

A length of pipe having threaded pin section and correspondingly threaded box section is provided, wherein the box section has on the end thereof a ring which leaves the threads of the box uncovered and which is effective to protect the pin from damage on makeup of pin and box to form the length. The ring is adapted to remain on the box after makeup to thereby form a part of the assembly, or may be so constructed so that it readily breaks away during makeup so as not to interfere with the mating of the threads.

---

This invention relates to a method of protecting pipe coatings and to protective covers for the ends of pipe joints.

When two lengths or joints of pipe or tubing must be joined together, it often occurs that the protective coating on one of the pipe joints will be chipped or scratched by the other joint unless the joints can be brought together carefully and precisely.

In certain operations, such as operations in wells, a relatively long length of pipe must be joined to a coupling or "box" which is coupled to the pipe in the well. The operator must maneuver the end or "pin" portion of the long length of pipe into the fixed box, making careful and precise control very difficult. In such operations, therefore, the lengths to be joined often come together with considerable force. When they do, it is likely that some chipping or scratching of the pipe coating at the periphery of the joint will occur. Once this coating is chipped, the pipe is then exposed to the corrosive environment. And any defect in the pipe at a distance from the surface results in considerable expense since the complete string must usually be brought to the surface and thence returned again to its original position in the well.

Probably the most successful attempt to solve this problem has taken the form of a plastic molding on the end of the joint. In other words, a layer of plastic has been molded to the periphery of the pipe at the joint. Although this method has met with considerable acceptance in the industry, it suffers from several distinct disadvantages. First of all, it is quite expensive, resulting in considerably increased cost of a joint of pipe. Also, it is permanent and cannot be removed; in some circumstances it may be undesirable to operate with the plastic molding for one reason or another.

Another attempt to solve this problem has been through the use of the so-called "stabbing-guide." As used in wells when it is desired to join a length of pipe to the tubing in the well, the stabbing-guide is a funnel-shaped member which is placed on the box before the pin is lowered. This aids in fitting the pin precisely into the box, but the disadvantages of this method are readily apparent. That is, each time a length of tubing is to be joined to the tubing in the well, the stabbing-guide must be affixed to the box, and then the stabbing-guide must be removed again if it is to be reused. Thus at least one and usually two extra operations are required resulting, of course, in considerably increased labor costs and loss of efficiency. Further, the stabbing-guide itself must be coated with a soft material in order to prevent the pin from chipping when it hits the stabbing-guide.

For these and other reasons, the known methods have not proved entirely satisfactory. The method of this invention overcomes all the disadvantages of the previous methods and results in a superior and unobvious procedure for overcoming the problems inherent in joining two lengths or joints of pipe.

This invention seeks to provide an improved method of joining two lengths of pipe, wherein the pipe coating is protected from damage resulting from the joining.

This invention also seeks to provide improved protective covers for lengths of pipe which are to be joined.

In order that the manner in which the foregoing are attained in accordance with the invention can be understood in detail, one advantageous embodiment of the invention will be described with reference to the accompanying drawings, which form a part of this specification, and wherein:

FIGURE 1 is a schematic view of a pin above a box having thereon a protective ring according to one embodiment of this invention.

FIGURE 2 is a vertical section showing a typical position of the pin when it strikes a coupling having thereon a protective ring according to one embodiment of this invention.

FIGURE 3 is a vertical sectional view illustrating the position of the pin when it has engaged the threads of a coupling having thereon a protective ring according to one embodiment of this invention.

FIGURE 4 is a schematic view of the lower part of a pin striking a coupling having thereon a protective ring constructed in accordance with another embodiment of this invention.

Referring now to FIGURE 1 in greater detail, a pin 1 having threads 2 is shown being joined to a coupling or box 8. The coupling or box 8 contains, on its inner surface, threads 6 which mate with the threads 2 of the pin. The protective ring 7 easily slips into engagement over the upper rim of the coupling 8, as is more clearly shown in FIGURE 2.

As seen in FIGURES 1 and 2, the protective ring according to this embodiment comprises an annulus-shaped base portion 3 (the annular area defining an inner circumference and an outer circumference), an inner wall 5 which is approximately perpendicular to the base portion 3, the inner wall being joined to the base portion entirely along the inner circumference or periphery of the base portion. Joined to the annular base portion entirely along its outer circumference is outer wall 4. This outer wall is also substantially perpendicular to the base portion, and it extends from the base portion in the same direction as does the inner wall 5. As is clearly seen in the illustration of FIGURE 2, it is usually convenient to have the outer wall greater in length than the inner wall. The inner and outer walls fit snugly next to the inner and outer walls, respectively, of the coupling or box 8, and parallel to the longitudinal axis thereof, while the base portion 3 fits over the end of the coupling, perpendicular to the longitudinal axis thereof.

As seen in FIGURES 2 and 3, the rim is recessed slightly so that the threads 6 may readily engage the threads of the pin despite the fact that the inner wall 5 of the protective ring 7 overlaps into the inner periphery of the coupling.

In FIGURE 4, however, is shown an embodiment which is useful even in the event that the rim of coupling 10 is not so recessed above the threads 11. In this embodiment, the protective ring 12 is brittle, so that it easily fractures when it is struck by the pin 13. Instead of making the ring brittle, it is often preferred to pre-cut the ring so that it will readily separate upon contact. For instance, a diagonal slit 14 might be cut in the ring so that the ring would separate at this point, as shown in FIGURE 1, for example.

The protective ring 7 may be made of any readily available material, but is advantageously made of a "plastic" or synthetic polymeric material such as polyethylene, polypropylene, or nylon. A low density or a high density plastic may be employed; likewise, a soft, flexible, plastic or a hard, brittle, plastic may be employed. The characteristics of the material chosen for the protective ring will depend on whether or not it is desired that the ring remain on the box. In other words, if it is desired that the ring remain on the box, the ring should be made of soft, flexible material. On the other hand, if it is desired that the ring break easily so that it can be removed in order that the pin may be threaded to the box (for example, as in the embodiment of FIGURE 4), then the ring should be made of hard, brittle material.

While this invention has been explained in terms of particularly advantageous embodiments, it will be understood that many various alternatives might be employed without departing from the scope hereof. For example, the protective covers may be designed to conform to the shape of any box which is of irregular configuration. Or the inner edge 5 might be shaped as merely a beveled edge, as illustrated in the FIGURE 3 embodiment.

I claim:
1. A length of threaded pipe comprising:
   a first section having an externally threaded pin portion;
   a second section having a box portion or coupling internally threaded so as to receive the threads of said pin portion and be threadedly engaged therewith, said threads starting at a point inward of the terminal end of said box portion, thereby providing a smooth inner cylindrical wall adjacent said terminal end having a diameter no less than the root diameter of said internal threads,
       said box portion or coupling being of tubular configuration defining an outer wall, an annular end generally perpendicular to said outer wall, and said inner wall parallel to said outer wall; and,
   a removable protective ring fitting against said end and against at least a portion of each said inner and outer walls adjacent said end, but leaving said threads uncovered,
       said ring protecting said pin portion against damage upon makeup of the pipe length, and remaining on said length after makeup of said sections.
2. A length of pipe in accordance with claim 1, wherein said ring includes:
   a flat base portion of annular configuration, for fitting flush against said end, the annular area defining an outer circumference and an inner circumference;
   an outer wall on one side of said base and perpendicular thereto, joining said base around said outer circumference; and
   an inner wall on the same side of said base as said outer wall, perpendicular to said base and joining said base around said inner circumference.
3. A length of pipe in accordance with claim 2, wherein said ring comprises a frangible, synthetic polymeric material whereby upon contact with said pin portion during make up of said pipe length said ring breaks away from said box portion so as to prevent interference with the mating of said threads.

References Cited

UNITED STATES PATENTS

| | | | |
|---|---|---|---|
| 97,853 | 12/1869 | Alden | 138—96 |
| 779,169 | 1/1905 | MacDonald | 285—55 |
| 2,656,857 | 10/1953 | Cavallier | 285—55 |
| 2,874,981 | 2/1959 | Brady | 285—374 X |
| 3,208,757 | 9/1965 | Jageman | 285—374 X |

FOREIGN PATENTS

| | | |
|---|---|---|
| 544,656 | 2/1956 | Belgium. |
| 1,141,021 | 3/1957 | France. |
| 1,331,527 | 5/1963 | France. |
| 387,169 | 12/1923 | Germany. |

CARL W. TOMLIN, *Primary Examiner.*

R. G. BERKLEY, *Assistant Examiner.*

UNITED STATES PATENT OFFICE
CERTIFICATE OF CORRECTION

Patent No. 3,352,574                            November 14, 1967

Arthur L. Brian

It is hereby certified that error appears in the above numbered patent requiring correction and that the said Letters Patent should read as corrected below.

In the heading to the printed specification, lines 3 and 4, for "Arthur L. Brian, 4707 Knotty Oaks Trail, Houston, Tex. 77045" read -- Arthur L. Brian, Houston, Tex., assignor to American Machine & Foundry Company, New York, N. Y., a corporation of New Jersey --.

Signed and sealed this 3rd day of December 1968.

(SEAL)
Attest:

Edward M. Fletcher, Jr.                         EDWARD J. BRENNER
Attesting Officer                                Commissioner of Patents